US008455784B2

(12) United States Patent
Wang et al.

(10) Patent No.: US 8,455,784 B2
(45) Date of Patent: Jun. 4, 2013

(54) METHOD AND SYSTEM FOR WELDING WORKPIECES

(75) Inventors: Pei-Chung Wang, Troy, MI (US); John D. Fickes, Brighton, MI (US); Xiaohong Q. Gayden, West Bloomfield, MI (US); Wuhua Yang, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1428 days.

(21) Appl. No.: 12/116,381

(22) Filed: May 7, 2008

(65) Prior Publication Data

US 2009/0277880 A1 Nov. 12, 2009

(51) Int. Cl.
*B23K 11/24* (2006.01)

(52) U.S. Cl.
USPC ......... 219/86.7; 219/110; 219/108; 219/86.1; 219/50

(58) Field of Classification Search
USPC .............................. 219/110, 108, 136, 137 R
See application file for complete search history.

(56) References Cited

U.S. PATENT DOCUMENTS

| | | | | |
|---|---|---|---|---|
| 1,403,548 A | * | 1/1922 | Gudeman | 422/125 |
| 2,005,229 A | * | 6/1935 | Loos et al. | 128/203.27 |
| 2,124,543 A | * | 7/1938 | Clyne | 392/393 |
| 2,152,466 A | * | 3/1939 | Clyne | 392/395 |
| 2,307,160 A | * | 1/1943 | Ryan, Jr. | 417/201 |
| 3,080,624 A | * | 3/1963 | Weber, III | 422/125 |
| 3,959,642 A | * | 5/1976 | Turro | 362/92 |
| 4,214,164 A | * | 7/1980 | Traub et al. | 250/338.1 |
| 4,359,622 A | * | 11/1982 | Dostoomian et al. | 219/110 |
| 4,387,691 A | * | 6/1983 | Marcoux et al. | 123/557 |
| 4,390,770 A | * | 6/1983 | Kohler et al. | 219/56.21 |
| 4,472,620 A | * | 9/1984 | Nied | 219/120 |
| 4,484,059 A | * | 11/1984 | Lillquist | 219/130.01 |
| 4,579,717 A | * | 4/1986 | Gyulay | 422/125 |
| 4,647,428 A | * | 3/1987 | Gyulay | 422/4 |
| 4,862,063 A | * | 8/1989 | Kobayashi et al. | 324/690 |
| 5,065,598 A | * | 11/1991 | Kurisu et al. | 62/330 |
| 5,321,225 A | * | 6/1994 | Boyer | 219/89 |
| 5,681,490 A | * | 10/1997 | Chang | 219/121.64 |
| 5,742,023 A | * | 4/1998 | Fortmann | 219/109 |
| 5,770,832 A | * | 6/1998 | Carnes et al. | 219/109 |

(Continued)

OTHER PUBLICATIONS

Tang et al., May 2003, Influence of Welding Machine Mechanical Characteristics on the Resistance Spot Welding Process and Weld Quality, Welding Journal 122-S.*

*Primary Examiner* — Joseph M Pelham
*Assistant Examiner* — Jimmy Chou
(74) *Attorney, Agent, or Firm* — Cantor Colburn LLP

(57) ABSTRACT

A method of welding two or more workpieces employing a motion-controlled electrode that reduces temperature and residual stresses at a workpiece-to-electrode interface is disclosed. During a first period of time, a first electrode force is applied to the workpieces to be welded, and a weld current is applied that causes heating of an associated workpiece-to-workpiece faying surface, the first electrode force being applied at a first electrode stroke. A temperature of the faying surface indicative of a weld nugget formation thereat is determined, and in response thereto the electrode force is reduced to a second level during a second period of time while maintaining a constant electrode stroke. During a third period of time, the electrode force is further reduced to a third level while simultaneously reducing the electrode stroke to a second level. Welding is stopped after the third period of time, resulting in a weld joint having reduced residual stresses and reduced likelihood of stress crack formation.

15 Claims, 5 Drawing Sheets

U.S. PATENT DOCUMENTS

| | | | | |
|---|---|---|---|---|
| 5,821,491 A * | 10/1998 | Dew et al. | ............... | 219/108 |
| 5,828,028 A * | 10/1998 | Cecil | ............... | 219/110 |
| 5,884,475 A * | 3/1999 | Hofmann et al. | ............... | 60/274 |
| 5,945,011 A * | 8/1999 | Takano et al. | ............... | 219/108 |
| 5,968,376 A * | 10/1999 | Shirk | ............... | 219/109 |
| 6,091,044 A * | 7/2000 | Larranaga et al. | ............... | 219/85.15 |
| 6,096,997 A * | 8/2000 | Shirk | ............... | 219/260 |
| 6,137,077 A * | 10/2000 | Moro et al. | ............... | 219/108 |
| 6,140,825 A * | 10/2000 | Fujii et al. | ............... | 324/718 |
| 6,155,695 A * | 12/2000 | Sealy | ............... | 362/237 |
| 6,208,146 B1 * | 3/2001 | Huang et al. | ............... | 324/421 |
| 6,215,086 B1 * | 4/2001 | Nishiwaki et al. | ............... | 219/108 |
| 6,573,470 B1 * | 6/2003 | Brown et al. | ............... | 219/86.51 |
| 6,633,016 B2 * | 10/2003 | Karakas | ............... | 219/110 |
| 6,901,748 B2 * | 6/2005 | Gomulka | ............... | 60/286 |
| 6,909,839 B2 * | 6/2005 | Wang et al. | ............... | 392/389 |
| 7,002,095 B2 * | 2/2006 | Kato et al. | ............... | 219/86.41 |
| 7,060,929 B2 * | 6/2006 | Sun et al. | ............... | 219/86.7 |
| 7,126,077 B2 * | 10/2006 | Wang | ............... | 219/117.1 |
| 7,238,911 B2 * | 7/2007 | Stevenson et al. | ............... | 219/120 |
| 7,246,919 B2 * | 7/2007 | Porchia et al. | ............... | 362/276 |
| 7,265,313 B2 * | 9/2007 | Stevenson et al. | ............... | 219/108 |
| 7,313,322 B2 * | 12/2007 | Starck et al. | ............... | 392/441 |
| 7,318,659 B2 * | 1/2008 | Demarest et al. | ............... | 362/253 |
| RE40,265 E * | 4/2008 | Nippert et al. | ............... | 219/119 |
| 7,503,675 B2 * | 3/2009 | Demarest et al. | ............... | 362/253 |
| 7,578,321 B2 * | 8/2009 | Levin | ............... | 141/55 |
| 7,604,378 B2 * | 10/2009 | Wolf et al. | ............... | 362/253 |
| 7,614,218 B2 * | 11/2009 | Akagawa | ............... | 60/295 |
| 7,647,767 B2 * | 1/2010 | Osaku et al. | ............... | 60/286 |
| 7,836,684 B2 * | 11/2010 | Starck et al. | ............... | 60/286 |
| 7,845,164 B2 * | 12/2010 | Leonard | ............... | 60/295 |
| 7,913,688 B2 * | 3/2011 | Cross et al. | ............... | 128/203.26 |
| 8,137,630 B2 * | 3/2012 | Jorgensen | ............... | 422/123 |
| 8,184,964 B2 * | 5/2012 | Haeberer et al. | ............... | 392/441 |
| 8,281,514 B2 * | 10/2012 | Fleming | ............... | 43/129 |
| 8,301,020 B2 * | 10/2012 | Wildegger | ............... | 392/479 |
| 2004/0076413 A1 * | 4/2004 | Biess et al. | ............... | 392/462 |
| 2004/0112874 A1 * | 6/2004 | Nastasi, Jr. | ............... | 219/109 |
| 2005/0063689 A1 * | 3/2005 | Auber | ............... | 392/468 |
| 2007/0079599 A1 * | 4/2007 | Osaku et al. | ............... | 60/283 |
| 2007/0212565 A1 * | 9/2007 | Urushihara et al. | ............... | 428/577 |
| 2008/0256937 A1 * | 10/2008 | Suzuki | ............... | 60/300 |
| 2008/0298788 A1 * | 12/2008 | Martucci et al. | ............... | 392/472 |
| 2009/0188896 A1 * | 7/2009 | Khakhalev et al. | ............... | 219/74 |
| 2009/0205320 A1 * | 8/2009 | Mokire et al. | ............... | 60/286 |
| 2010/0071355 A1 * | 3/2010 | Brown et al. | ............... | 60/303 |
| 2010/0162690 A1 * | 7/2010 | Hosaka et al. | ............... | 60/295 |
| 2010/0175469 A1 * | 7/2010 | Ni | ............... | 73/204.27 |
| 2010/0193530 A1 * | 8/2010 | Leonard et al. | ............... | 220/694 |

* cited by examiner

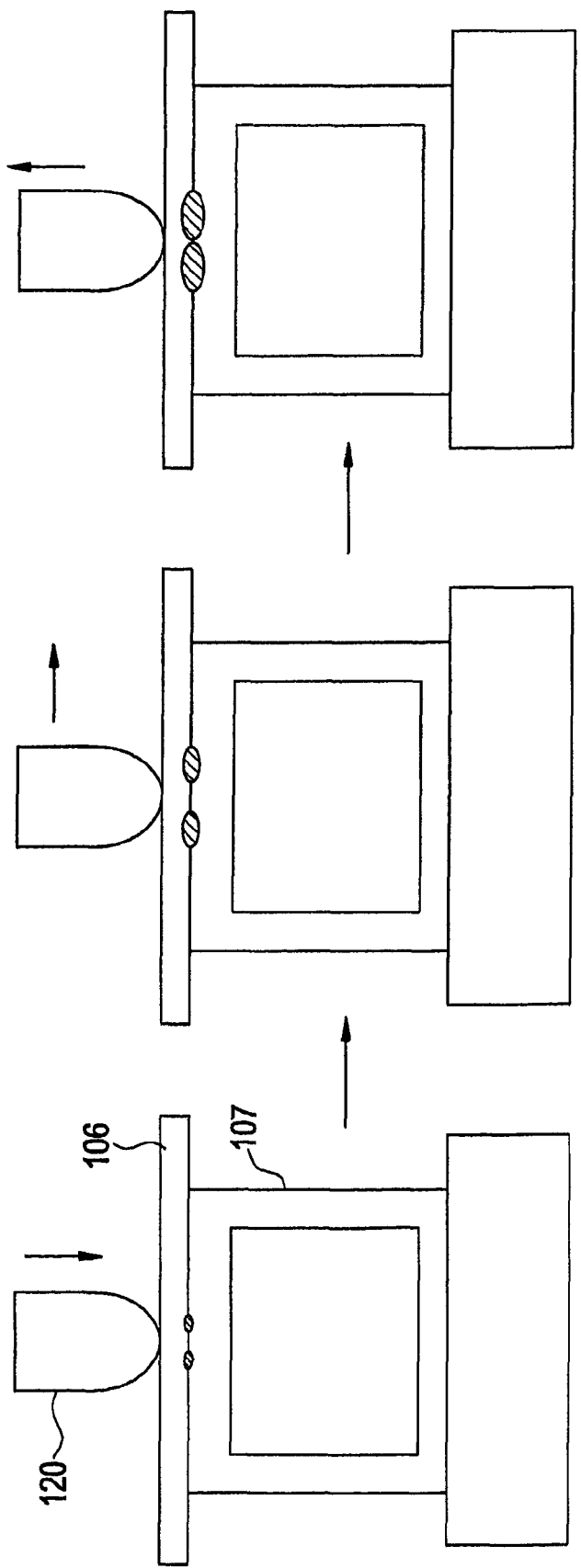

METHOD AND SYSTEM FOR WELDING WORKPIECES

BACKGROUND OF THE INVENTION

The present disclosure relates generally to welding, particularly to welding high strength steel, and more particularly to welding high strength steel using a motion-controlled electrode to reduce temperatures at the electrode-to-workpiece interface, thereby reducing residual stress and the likelihood of stress cracking in the workpiece.

High strength steels, such as TRIP 800 steel (TRansformation Induced Plasticity steel having a tensile strength of about 800 Mega-Pascals) for example, have utility in the automotive field where the high strength provides benefits, such as fuel efficiency and reduced emission level for example, over lower strength steels since lower gauge materials may be used for the vehicle structure, thereby reducing the vehicle weight while maintaining the structural integrity of the vehicle.

Structures made of high strength steel, however, present a challenge for vehicle assembly, such as the development of stress cracking at the periphery of the weld surfaces in resistance spot welding processes. The non-uniformity of electrical current distribution at the electrode-to-workpiece interface during welding tends to result in localized heat build-up, which causes high residual stresses. The combination of high residual stresses and low ductility may ultimately result in stress cracking in resistance welding of high strength steels.

While existing manufacturing materials and processes may be suitable for their intended purpose, there remains, however, a need in the art for a welding method and apparatus that provides improved control for welding high strength steels, thereby overcoming the aforementioned drawbacks presently associated with welding high strength steels.

BRIEF DESCRIPTION OF THE INVENTION

An embodiment of the invention includes a method of welding two or more workpieces employing a motion-controlled electrode that reduces temperature and residual stresses at a workpiece-to-electrode interface. During a first period of time, a first electrode force is applied to the workpieces to be welded, and a weld current is applied that causes heating of an associated workpiece-to-workpiece faying surface, the first electrode force being applied at a first electrode stroke. A temperature of the faying surface indicative of a weld nugget formation thereat is determined, and in response thereto the electrode force is reduced to a second level during a second period of time while maintaining a constant electrode stroke. During a third period of time, the electrode force is further reduced to a third level while simultaneously reducing the electrode stroke to a second level. Welding is stopped after the third period of time, resulting in a weld joint having reduced residual stresses and reduced likelihood of stress crack formation.

Another embodiment of the invention includes an apparatus for welding two or more workpieces that reduces temperature and residual stresses at an associated workpiece-to-electrode interface. The apparatus includes a motion-controlled welder having a welding electrode and a power source productive of weld current to the electrode, a processor in signal communication with the motion-controlled welder for controlling stroke and force of the electrode, and for controlling weld current to the electrode, and a temperature sensor disposed to sense a temperature of the workpieces, and being in signal communication with the processor for communicating temperature information thereto. The processor is responsive to executable instructions when executed thereon for practicing the above-noted method.

A further embodiment of the invention includes a computer program product for welding two or more workpieces employing a motion-controlled electrode that reduces temperature and residual stresses at an associated workpiece-to-electrode interface. The product includes a storage medium, readable by a processing circuit, storing instructions for execution by the processing circuit for practicing the above-noted method.

These and other advantages and features will be more readily understood from the following detailed description of preferred embodiments of the invention that is provided in connection with the accompanying drawings.

BRIEF DESCRIPTION OF THE DRAWINGS

Referring now to the drawings, which are meant to be exemplary and not limiting, and wherein like elements are numbered alike in the accompanying Figures:

FIG. 5 depicts in block diagram form the process of FIG. 2.

DETAILED DESCRIPTION OF THE INVENTION

An embodiment of the invention, as shown and described by the various figures and accompanying text, provides a method of welding two or more workpieces employing a motion-controlled electrode that reduces temperature and residual stresses at a workpiece-to-electrode interface. During a weld cycle, the force of the electrode against the workpiece is reduced upon the formation of a weld nugget, and subsequent thereto, both the force and stroke of the electrode against the workpiece are reduced, thereby resulting in a weld having reduced residual stresses and reduced likelihood of stress crack formation.

Figure 1:
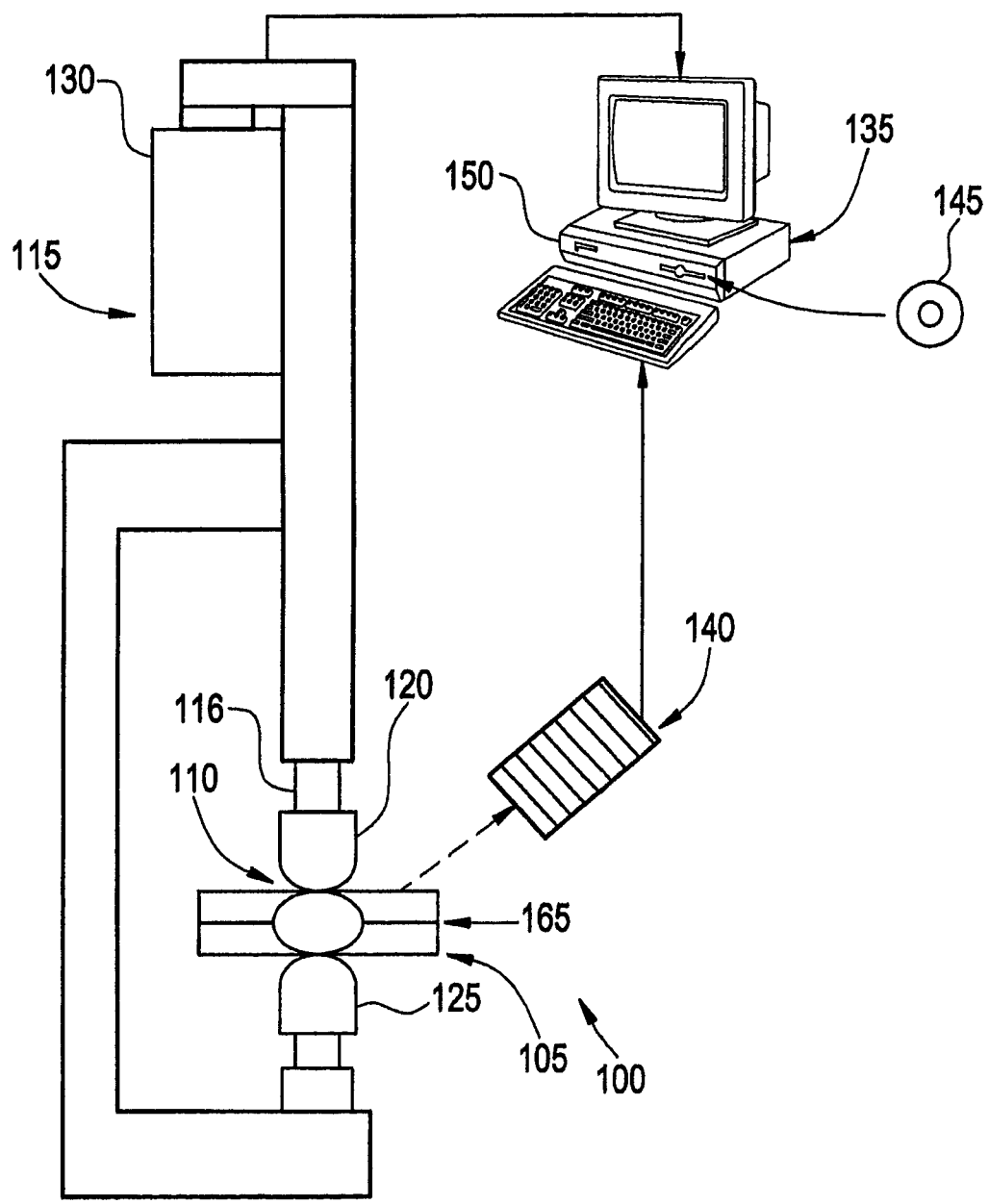
FIG. 1 depicts an exemplary system for welding workpieces in accordance with an embodiment of the invention.

Referring to FIG. 1, an apparatus 100 for welding two workpieces 105 that reduces temperature and local residual stresses at a workpiece-to-electrode interface 110 is illustrated. The apparatus 100 includes a motion-controlled welder 115 having welding electrodes 120, 125 and a power source 130 productive of weld current to the electrodes 120, 125. In an embodiment, the motion-controlled welder 115 includes a servo 116 for driving the electrode 120 on command. The apparatus 100 illustrated in FIG. 1 includes two electrodes 120, 125 for performing a two-sided spot welding process. However, embodiments of the invention also apply to a single-sided spot welding process, such as welding a steel sheet to a rigid steel frame for example, that would employ only one electrode 120. The apparatus 100 also includes a processor 135 and a temperature sensor 140. The processor is disposed in signal communication with the motion-controlled welder 115 for controlling stroke and force of at least one electrode 120, and for controlling weld current to the electrode from power source 130. The temperature sensor 140 is disposed at a distance from but proximate the workpieces 105 so as to sense a temperature of the workpieces 105, and is in signal communication with the processor 135 for communicating the sensed temperature information thereto. In an embodiment, temperature sensor 140 is an infrared sensor/camera for sensing infrared signals emitted from a surface of workpieces 105, however, temperature sensor 140 may be any temperature sensing device suitable for the purposes disclosed herein, such as a thermocouple for example. Executable instructions readable by the processor 135 may reside on a CD-ROM 145 or within a memory residing within the computer housing 150 that also houses processor 135. The processor 135 is responsive to the executable instructions when executed thereon for controlling the weld cycle, which will now be discussed with reference to FIG. 2 that illustrates force and stroke of electrode 120 as a function of time during a weld cycle.

Figure 2:
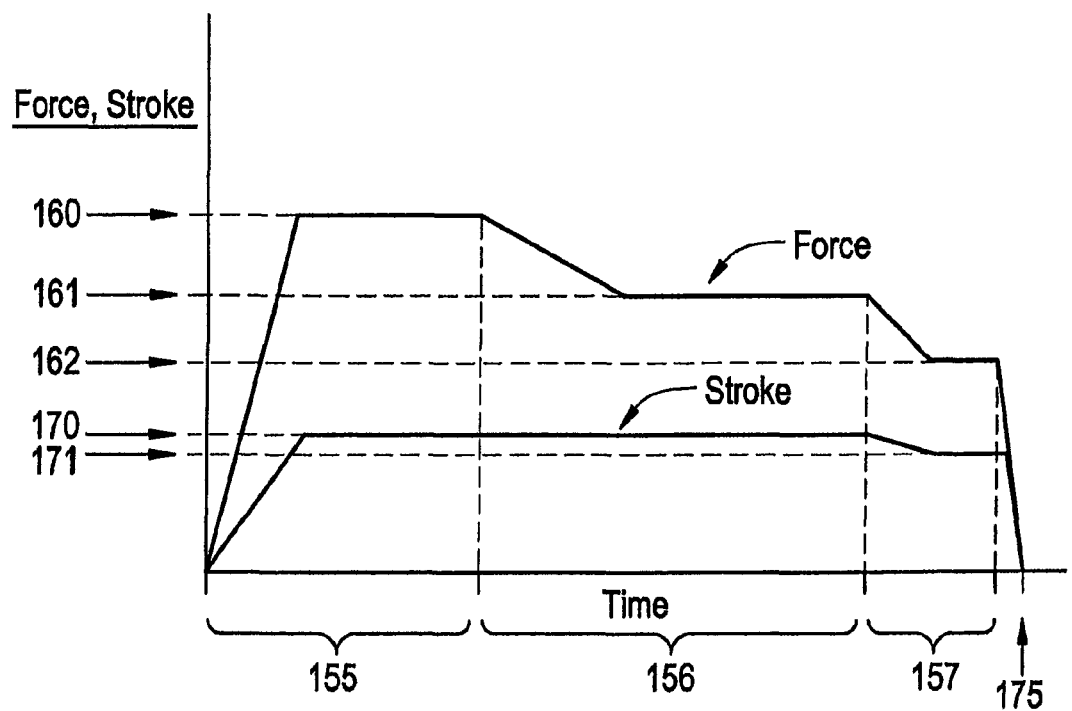
FIG. 2 depicts in graphical form an exemplary process for welding workpieces in accordance with an embodiment of the invention using the system of FIG. 1.

Referring now to FIG. 2 in combination with the apparatus of FIG. 1, during a first period of time 155, a first electrode force 160 is applied to the two workpieces 105 to be welded, while simultaneously applying a weld current that causes heating of the workpiece-to-workpiece faying surface 165 (see FIG. 1), the first electrode force 160 being applied at a first electrode stroke 170.

Via temperature sensor 140 and processor 135, a temperature at the faying surface 165 indicative of a weld nugget formation thereat is determined, and in response thereto the electrode force is reduced to a second level 161 during a second period of time 156 while maintaining a constant electrode stroke 170. By reducing the electrode force while maintaining a constant stroke, the electrode 120 will maintain contact with the workpieces for completion of the weld cycle, but will not be further driven into the softened workpieces thereby reducing the likelihood of developing localized residual stresses within the workpieces. In an embodiment, the second level of force 161 is equal to or less than 95% and equal to or greater than 50% of the first level of force 160.

In view of the faying surface 165 being hidden from view, the temperature thereat may not be directly readable by infrared temperature sensor 140. As such, the temperature at a viewable surface of the workpieces 105 can be sensed by sensor 140, and through known heat transfer equations or analysis techniques the temperature at the faying surface can be determined by performing an equation-based extrapolation routine, a finite element analysis, or an other heat transfer analysis suitable for the purposes disclosed herein.

Figure 3:
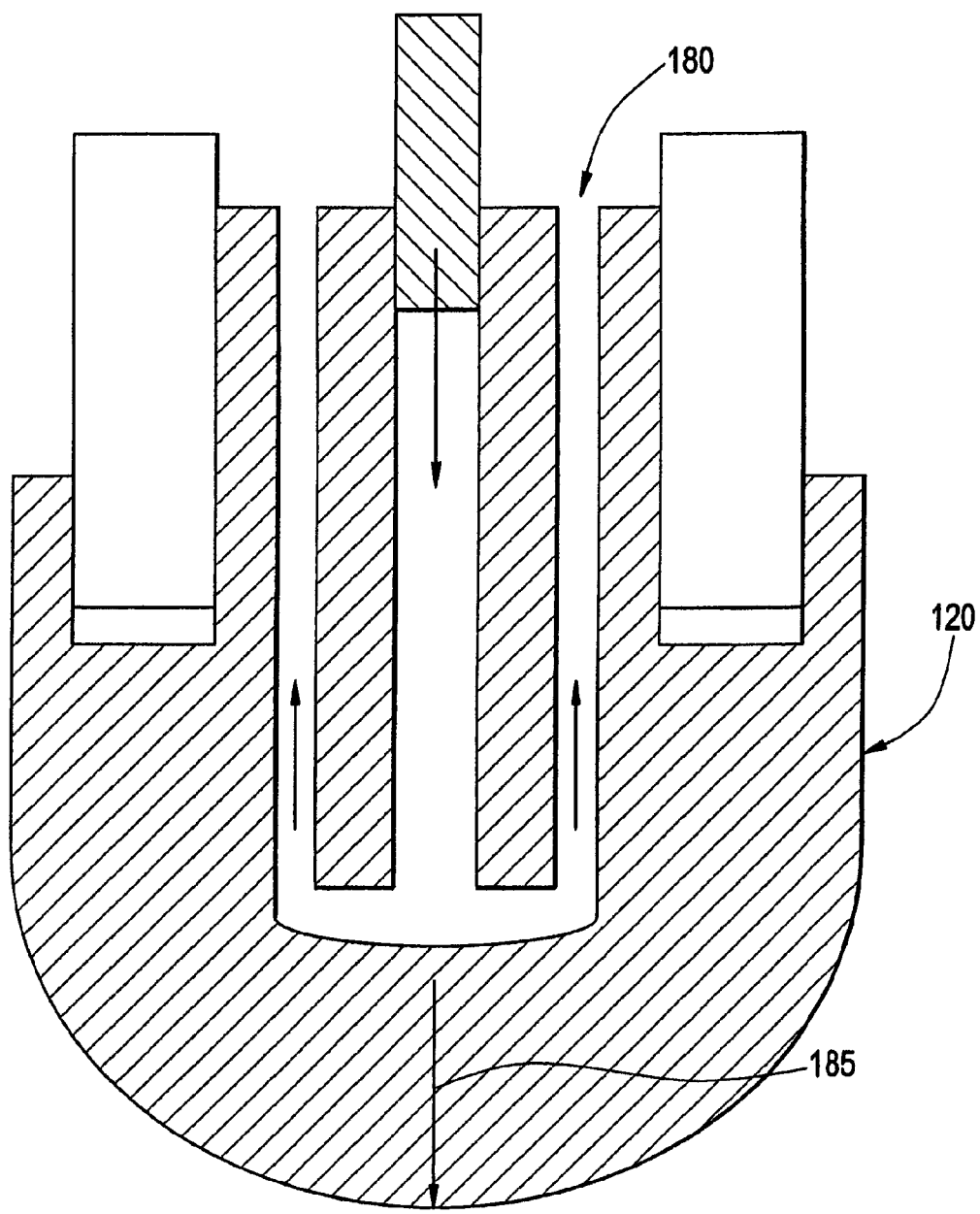
FIG. 3 depicts an exemplary electrode cap for use in accordance with an embodiment of the invention.
Figure 4:
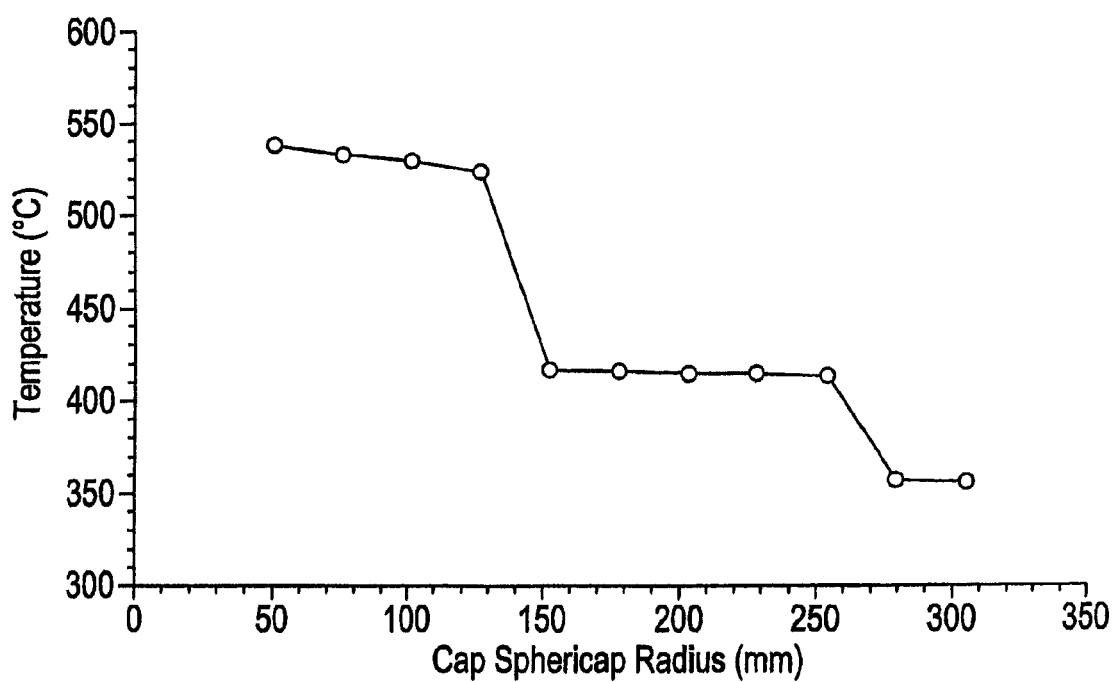
FIG. 4 depicts in graphical form experimental data relating to an embodiment of the invention.

During a third period of time 157, the electrode force is further reduce to a third level 162 while simultaneously reducing the electrode stroke to a second level 171 and reducing the weld current, which effectively serves as a cooling cycle that further reduces the likelihood of developing localized residual stresses within the workpieces. In an embodiment, one or both of the electrodes 120, 125 may be water-cooled during any one of the first 155, second 156 and third 157 time periods. Referring briefly to FIG. 3, an exemplary electrode 120 is illustrated having a channel 180 for receiving and delivering cooling water to the cap of the electrode, which in an embodiment has a cap spherical radius 185 equal to or greater than 150 millimeters (mm) and equal to or less than 250 mm, the larger cap radius (larger than typical welding electrodes) being experimentally found to effectively reduce the temperature of the electrode-to-workpiece interface, as illustrated in the graph of FIG. 4 (electrode-to-workpiece temperature versus cap spherical radius, where the workpieces were made from aluminum).

Referring back to FIG. 2, at the end of the weld cycle 175 after the third period of time 157, processor 135 causes welder 115 to stop the welding, with the end result being a weld joint having reduced residual stresses at the electrode-to-workpiece interface with a reduced likelihood of stress crack formation.

FIG. 5 illustrates in block diagram form the welding process illustrated by FIG. 2, but in a single-sided spot welding process employing a single electrode 120, a first workpiece 106 in the form of a sheet or panel, and a second workpiece 107 in the form of a structural member. Comparing FIG. 5 with FIG. 2, position (A) corresponds with the first time period 155 where the electrode 120 is lowered to start the welding process, position (B) corresponds with the second time period 156 where the electrode force is reduced upon sensing the formation of a weld nugget and a constant stroke is maintained, and position (C) corresponds with the third time period 157 where the electrode force and stroke are reduced by slightly withdrawing the electrode during the cooling cycle and the solidification stage of the weld nugget.

While certain combinations of steps and features relating to an improved welding cycle have been described herein, it will be appreciated that these certain combinations are for illustration purposes only and that any combination of any of these steps and features may be employed, explicitly or equivalently, either individually or in combination with any other of the steps and features disclosed herein, in any combination, and all in accordance with an embodiment of the invention. Any and all such combinations are contemplated herein and are considered within the scope of the invention disclosed.

While an embodiment of the invention has been described employing TRIP 800 as a suitable high strength steel, it will be appreciated that the scope of the invention is not so limited, and that the invention also applies to other steels, particularly to other high strength steels such as any steel having a yield strength greater than 200 Mpa, and more particularly to metals having high yield strength and low ductility.

While embodiments of the invention have been described and illustrated employing two workpieces 105 that are welded together, it will be appreciated that the scope of the invention is not so limited, and that the scope of the invention also applies to the welding of more than two workpieces together, such as three or more workpieces, for example, as the welding of multiple workpieces is commonplace in the automotive industry.

An embodiment of the invention may be embodied in the form of computer-implemented processes and apparatuses for practicing those processes. Embodiments of the invention may also be embodied in the form of a computer program product having computer program code containing instructions embodied in tangible media, such as floppy diskettes, CD-ROMs, hard drives, USB (universal serial bus) drives, or any other computer readable storage medium, such as read-only memory (ROM), random access memory (RAM), and erasable-programmable read only memory (EPROM), for example, wherein, when the computer program code is loaded into and executed by a computer, the computer becomes an apparatus for practicing embodiments of the invention. Embodiments of the invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the invention. When implemented on a general-purpose microprocessor, the computer program code segments configure the microprocessor to create specific logic circuits. A technical effect of the executable instructions is to control the welding of high strength steel workpieces so as to reduce localized residual stresses and reduce the likelihood of stress crack formation at the weld site.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of welding two or more workpieces employing a motion-controlled electrode that reduces temperature and residual stresses at an associated workpiece-to-electrode interface, the method comprising:
  applying, during a first period of time, a first electrode force to the workpieces to be welded, and applying a weld current that causes heating of an associated workpiece-to-workpiece faying surface, the first electrode force being applied at a first electrode stroke;
  determining a temperature of the faying surface indicative of a weld nugget formation thereat, and in response thereto reducing the electrode force to a second level during a second period of time while maintaining a constant electrode stroke;
  during a third period of time, further reducing the electrode force to a third level while simultaneously reducing the electrode stroke to a second level; and
  stopping the welding after the third period of time, resulting in a weld joint having reduced residual stresses and reduced likelihood of stress crack formation.

2. The method of claim 1, wherein the applied second electrode force is equal to or less than 95% of the first electrode force and equal to or greater than 50% of the first electrode force.

3. The method of claim 1, wherein the determining a temperature of the faying surface comprises determining using an infrared sensor a temperature of the workpieces at a distance from the faying surface, and in response thereto performing on a processor an extrapolation routine to determine the temperature of the faying surface.

4. The method of claim 1, wherein at least one of the workpieces comprises high strength steel.

5. The method of claim 1, wherein the applying a first electrode force, the reducing the electrode force to a second level, and the further reducing the electrode force to a third level is accomplished using a servo-controlled electrode.

6. The method of claim 1, further comprising water-cooling the electrode during at least one of the first period of time, the second period of time and the third period of time.

7. The method of claim 1, further comprising water-cooling the electrode during at least one of the second period of time and the third period of time.

8. The method of claim 1, further comprising water-cooling the electrode during the third period of time.

9. The method of claim 1, further comprising providing an electrode having a cap spherical radius equal to or greater than 150 mm and equal to or less than 250 mm.

10. An apparatus for welding two or more workpieces that reduces temperature and residual stresses at an associated workpiece-to-electrode interface, the apparatus comprising:
  a motion-controlled welder having a welding electrode and a power source productive of weld current to the electrode;
  a processor in signal communication with the motion-controlled welder for controlling stroke and force of the electrode, and for controlling weld current to the electrode;
  a temperature sensor disposed to sense a temperature of the workpieces, and being in signal communication with the processor for communicating temperature information thereto;
  wherein the processor is responsive to executable instructions when executed thereon for: applying, during a first period of time, a first electrode force to the workpieces to be welded, and applying a weld current that causes heating of an associated workpiece-to-workpiece faying surface, the first electrode force being applied at a first electrode stroke;
  determining a temperature of the faying surface indicative of a weld nugget formation thereat, and in response thereto reducing the electrode force to a second level during a second period of time while maintaining a constant electrode stroke;
  during a third period of time, further reducing the electrode force to a third level while simultaneously reducing the electrode stroke to a second level; and
  stopping the welding after the third period of time, resulting in a weld joint having reduced residual stresses and reduced likelihood of stress crack formation.

11. The apparatus of claim 10, wherein at least one of the workpieces comprises high strength steel.

12. The apparatus of claim 10, wherein the welding electrode comprises a cap spherical radius equal to or greater than 150 mm and equal to or less than 250 mm.

13. The apparatus of claim 10, wherein the welding electrode comprises a servo-controlled electrode.

14. The apparatus of claim 10, wherein the welding electrode comprises a water-cooled electrode.

15. The apparatus of claim 10, wherein the temperature sensor comprises an infrared sensor.

* * * * *